United States Patent [19]

Vogt et al.

[11] Patent Number: 4,753,915

[45] Date of Patent: Jun. 28, 1988

[54] PROCESS FOR MAKING A CARRIER-SUPPORTED CATALYST

[75] Inventors: Wilhelm Vogt, Hürth; Hermann Glaser, Erftstadt; Eitel Goedicke, Bergheim, all of Fed. Rep. of Germany

[73] Assignee: Hoechst Aktiengesellschaft, Hurth Knapsack, Fed. Rep. of Germany

[21] Appl. No.: 921,945

[22] Filed: Oct. 22, 1986

[30] Foreign Application Priority Data

Nov. 5, 1985 [DE] Fed. Rep. of Germany ....... 3539127

[51] Int. Cl.$^4$ .................... B01J 21/04; B01J 21/06; B01J 23/10; B01J 23/74
[52] U.S. Cl. .................................. 502/304; 423/213.5
[58] Field of Search ............................ 502/304, 327; 423/213.5

[56] References Cited

U.S. PATENT DOCUMENTS 4,294,726 10/1981 Bozon et al. ..................... 502/304
4,367,162 1/1983 Fujitani et al. ................. 502/304 X
4,587,231 5/1986 Sawamura et al. ................. 502/304

*Primary Examiner*—W. J. Shine

[57] ABSTRACT

A carrier-supported catalyst is made by applying one or more non-noble metal and noble metal components on to a ceramic honeycomb structure coated with a layer of a heat-resistant metal oxide. To this end, the ceramic honeycomb structure is dipped at least once into an aqueous suspension of pseudoboehmite and zirconium oxide hydrate, the honeycomb structure so treated is dried at temperatures of up to 250° C. and calcined at temperatures of up to 1000° C.; next, the honeycomb structure is impregnated with an aqueous solution of at least one iron salt, and, if desired, nickel and cerium salts, dried at temperatures of up to 250° C. and annealed at temperatures of up to 600° C.; next, the honeycomb structure is impregnated with an aqueous solution containing at least one soluble compound of platinum, rhodium or palladium, and, if desired cerium, one of the solutions under (b) or (c) being required to contain cerium; the honeycomb structure so treated is ultimately dried at temperatures of up to 250° C. and annealed at temperatures of up to 600° C.

10 Claims, No Drawings

PROCESS FOR MAKING A CARRIER-SUPPORTED CATALYST

This invention relates to a process for making a carrier-supported catalyst by applying one or more non-noble metal and noble metal components on to a ceramic honey comb structure coated with a layer of heat-resistant metal oxides.

German Specification No. DE-OS 2 212 616 describes a catalyst suitable for oxidizing organic compounds and reducing nitrogen oxides which is comprised of an inert ceramic honey comb structure coated with a basic layer of a heat-resistant metal oxide having a mixture of platinum, rhodium and at least one non-noble metal applied thereto. The catalyst is made by dipping the ceramic honeycomb structure in the suspension of the heat-resistant metal oxide containing hydrate and subsequently calcining it at temperatures of from 400° to 800° C. More specifically, the coated honey comb structure is impregnated by dipping it in the aqueous solution of hexachloroplatinic acid and salts of rhodium and a non-noble metal, and the honeycomb structure so impregnated is ultimately calcined at temperatures of from 150° to 800° C.

A carrier-supported catalyst for use in the decontamination of off-gases of a combustion engine by oxidizing carbon monoxide and hydrocarbons and reducing nitrogen oxides is invariably required to provide for these two reactions to be initiated at low temperature, to ensure high reaction velocities even in the event of the gas composition varying from its stoichiometric composition, and to be high temperature resistant.

It is therefore desirable to have a process for making a carrier-supported catalyst complying with the requirements aforesaid by applying one or more non-noble metal and noble metal components on to a ceramic honeycomb structure coated with a layer of a heat-resistant metal oxide. To this end, the invention provides a process which comprises:

(a) dipping the ceramic honeycomb structure at least once into an aqueous suspension consisting of pseudoboehmite and zirconium oxide hydrate, drying the honeycomb structure so treated at temperatures of up to 250° C. and calcining it at temperatures of up to 1000° C.;

(b) impregnating the honeycomb structure treated as described under (a) with an aqueous solution of at least one iron salt, and, if desired, salts of nickel and cerium, drying the honeycomb structure so treated and impregnated at temperatures of up to 250° C. and annealing it at temperatures of up to 600° C.;

(c) impregnating the honeycomb·structure treated as described under (b) with an aqueous solution containing at least one soluble compound of a noble metal selected from the group consisting of platinum, rhodium and palladium, and, if desired, a cerium salt, drying the honeycomb structure so treated at temperatures of up to 250° C. and annealing it at temperatures of up to 600° C.

In the process of this invention, it is however invariably necessary for one of the solutions under (b) or (c) to contain the cerium.

Further preferred features of the process of this invention provide:

(a) for the ratio by weight of pseudoboehmite to zirconium oxide hydrate, calculated as oxides, to be 1:0.01–1:0.1;

(b) for the solution under (c) to contain the metals in the form of their chlorides and/or nitrates and to have a pH of from 1–2;

(c) for the solution under (c) to contain the metals in the form of their complexes with a substituted acetic acid, preferably nitrilotriacetic acid or ethylene diaminotetraacetic acid, and to have a pH of from 8–10.

The invention finally provides for the carrier-supported catalyst made as disclosed herein to be used for:

(d) oxidizing carbon monoxide and hydrocarbons at temperatures higher than 350° C.;

(e) reducing nitrogen oxides at temperatures higher than 300° C.;

(f) decontaminating the off gases of combustion engines.

The process of this invention also provides for the suspendability of pseudoboehmite in water to be improved by peptizing it with an acid, e.g. acetic acid or nitric acid.

In the process of this invention, the zirconium oxide hydrate should preferably be produced by hydrolizing a zirconium alcoholate, e.g. zirconium n-propylate, in the pseudoboehmite suspension.

A carrier-supported catalyst containing platinum and rhodium made by this invention can suitably be used for oxidizing carbon monoxide and hydrocarbons and also for reducing nitrogen oxides.

A carrier-supported catalyst containing platinum and palladium made in accordance with this invention is particularly suitable for oxidizing carbon monoxide and hydrocarbons.

The carrier-supported catalysts made by the process of this invention have an activity which provides for a 50% conversion of carbon monoxide, hydrocarbons and nitrogen oxide at $\lambda = 1.01$ and a spatial velocity of 50.000 $h^{-1}$, already at temperatures of from 210°–240° C. In addition, the carrier-supported catalysts of this invention permit short periodic deviations from the means value $\lambda = 1.01$ to be compensated without undergoing any significant loss in activity.

The upper limiting concentrations for the carrier-supported catalyst of this invention should conveniently be selected as follows: 30% $Al_2O_3$; 5% $ZrO_2$; 3% $Fe_2O_3$; 3% NiO; 3% $CeO_2$; 0.5% Pt; 0.1% Rh and 0.5% Pd, based on the weight of the ready-for-use catalyst.

EXAMPLE 1

(Invention)

17.9 kg commercially available pseudoboehmite (PURAL NG; this is a registered Trade Mark of CONDEA CHEMIE AG, Hamburg, Federal Republic of Germany) was stirred into 24.5 kg water. 260 g acetic acid was added for peptizing the batch and the whole was stirred for 2 hours. Next, 4 kg zirconium tetrapropylate (28% $ZrO_2$) was stirred into the suspension and a creamy, yet readily flowable suspension containing 7.7% $ZrO_2$, based on $Al_2O_3$, was obtained. The suspension was used for coating a ceramic honeycomb structure with a layer of 17% $Al_2O_3 + ZrO_2$, and the coated honeycomb structure was calcined for 4 hours at 950° C.

The honeycomb structure so coated which had a weight of 625 g and a power for absorbing water of 121 ml was impregnated with 2 l of an acid solution containing 316 g $Ce(NO_3)_3.6H_2O$ and 335 g $Fe(NO_3)_3.9H_2O$. Next, the impregnated honeycomb structure was blown out using air at room temperature, dried for 2 minutes with hot air preheated to 250° C. and calcined for 2 hours at 600° C. The honeycomb structure coated twice was impregnated by dipping it in 2 l of an aqueous solution which contained
14.74 g $H_2[PtCl_6]$: (40% Pt)
3.14 g $RhCl_2$: (37.5% Rh), and
16 g nitrilotriacetic acid,
and had a pH of 10. The honeycomb structure so impregnated was blown out with air at room temperature, dried for 2 minutes with air preheated to 250° C., and calcined for 2 hours at 550° C. The impregnation including the drying and calcining steps just described were repeated; the resulting catalyst was found to contain:
1780 ppm Pt
360 ppm Rh
1.19% $CeO_2$
0.63% $Fe_2O_3$
1.3% $ZrO_2$.

EXAMPLE 2

(Invention)

10.4 kg DISPERSAL 30/3 and 7 kg PURALOX (these are registered Trade Marks of CONDEA CHEMIE AG, Hamburg, Federal Republic of Germany) were stirred into 25.4 kg water, the whole was admixed with 4 kg zirconium tetrapropylate (28% $ZrO_2$) and a creamy, yet well flowable suspension was obtained. It was used for coating a ceramic honeycomb structure with a layer of $Al_2O_3$ and $ZrO_2$, as described in Example 1.

Next, the coated honeycomb structure was coated with a second layer of cerium oxide and iron oxide and ultimately with a layer of platinum and rhodium which were used in identical concentrations.

EXAMPLE 3

(Invention)

A ceramic honeycomb structure was coated with a layer of $Al_2O_3$ and $ZrO_2$, as described in Example 1.

The coated honeycomb structure was impregnated with 2 l of an aqueous solution containing
316 g $Ce(NO_3)_3.6H_2O$
335 g $Fe(NO_3)_3.9H_2O$
400 g $Ni(NO_3)_2.6H_2O$.
After drying and calcining, the honeycomb structure coated twice was coated with a second layer by impregnating it twice with platinum and rhodium, as described in Example 1.

The catalyst so made was found to contain:
1800 ppm Pt
350 ppm Rh
1.20% $CeO_2$
0.63% $Fe_2O_3$
0.96% NiO
1.26% $ZrO_2$.

EXAMPLE 4

(Invention)

A ceramic honeycomb structure was coated with $Al_2O_3$ and $ZrO_2$, as described in Example 1.

The coated honeycomb structure was impregnated with 2 l of an aqueous solution containing 335 g $Fe(NO_3)_3.9H_2O$. After drying and calcining as described in Example 1, the honeycomb structure coated twice was impregnated once with a solution containing:
316 g $Ce(NO_3)_3.6H_2O$
60.3 g $H_2[PtCl_6]$: (40% Pt)
12.78 g $RhCl_3$: (37.5% Rh). The catalyst so treated was dried and calcined as described in Example 1, and found to contain:
7.6 g $CeO_2$=1.2% $CeO_2$
4.01 g $Fe_2O_3$=0.63% $Fe_2O_3$
1.45 g Pt=2270 ppm Pt
0.29 g Rh=450 ppm Rh 1.3% $ZrO_2$

EXAMPLE 5

(Invention)

A ceramic honeycomb structure was coated first with a layer of $Al_2O_3$ and $ZrO_2$ and then with a second layer of $CeO_2$ and $Fe_2O_3$, as described in Example 1.

The honeycomb structure coated twice was impregnated with 2 l of an aqueous solution which contained:
316 g $Ce(NO_3)_3.6H_2O$
60.3 g $H_2[PtCl_6]$: (40% Pt)
12.8 g $RhCl_2$: (37.5% Rh)
280 g nitrilotriacetic acid and had a ph of 10. The steps of drying and calcining were effected as described in Example 1.

The catalyst so made was found to contain:
1800 ppm Pt
370 ppm Rh
0.6% $Fe_2O_3$
2.2% $CeO_2$
1.25% $ZrO_2$

EXAMPLE 6

(Comparative Example)

Example 1 was repeated with that modification however that the honeycomb structure was treated with a suspension just of peptized pseudoboehmite and was thus coated with a layer consisting only of $Al_2O_3$.

The resulting catalyst was found to contain:
1810 ppm Pt
380 ppm Rh
1.2% $CeO_2$
0.65% $Fe_2O_3$.

The catalysts prepared as described in Examples 1 through 6 were cut into specimens 2.5 cm and 7.52 cm long. Each of the specimens was contacted at a spatial velocity of 50.000 $h^{-1}$ with a gas stream consisting of:
73.5 vol. % $N_2$
14.0 vol. % $CO_2$
0.33 vol. % $H_2$
0.99 vol. % CO
1.0 vol. % $O_2$
9.97 vol. % $H_2O$-stream
500 ppm $C_3H_6$
1000 ppm $NO_x$ The temperature at which 50% of the carbon monoxide, hydrocarbons (HC) and nitrogen oxides contained in the gas mixture, were found to have been converted was determined (cf. Table 1 hereinafter).

Specimens 2.5 cm wide and 5 cm long were cut from the catalysts of Examples 1 through 6, and initially aged over a period of 4 hours at 980° C. in a gas stream consisting of 90% nitrogen and 10% steam.

Each of the aged specimens was charged at a spatial load of 75.000 $h^{-1}$ with a gas load which varied periodically within the limits of ±0.054 around the mean λ-value of 1.01; the measurement tests were made at 400° C. at a pulsation frequency of ½ and 1 hertz (cf. Table 2 hereinafter).

TABLE 1

| Catalyst of Example | 50% conversion [°C.] | | | | | |
|---|---|---|---|---|---|---|
| | 1 | 2 | 3 | 4 | 5 | 6 |
| CO | 200 | 195 | 205 | 200 | 195 | 275 |
| HC | 210 | 205 | 220 | 215 | 210 | 270 |
| $NO_x$ | 230 | 230 | 235 | 230 | 235 | 275 |

TABLE 2

| Catalyst of Example | Periodic variation of λ-value [% conversion] | | | | | |
|---|---|---|---|---|---|---|
| | 1 | 2 | 3 | 4 | 5 | 6 |
| impulse frequency ½Hertz | | | | | | |
| CO | 97 | 96 | 99 | 95 | 96 | 79 |
| HC | 98 | 97 | 95 | 94 | 95 | 100 |
| $NO_x$ | 98 | 96 | 90 | 91 | 92 | 81 |
| impulse frequency 1 Hertz | | | | | | |
| CO | 99 | 98 | 100 | 96 | 96 | 91 |
| HC | 100 | 100 | 97 | 95 | 95 | 100 |
| $NO_x$ | 98 | 99 | 94 | 92 | 93 | 82 |

We claim:
1. A process for making a carrier-supported catalyst by applying at least one non-noble metal component and at least one noble metal component selected from the group consisting of platinum, rhodium and palladium on to a ceramic honeycomb structure coated with a layer of alumina and zirconia serving as heat-resistent metal oxides, which comprises:
   (a) dipping the ceramic honeycomb structure at least once into an aqueous suspension containing pseudoboehmite and zirconium oxide hydrate in a ratio by weight of 1:0.01 to 1:0.1, calculated as oxides, drying the honeycomb structure so treated at temperatures of up to 250° C. and calcining it at temperatures of up to 1000° C.;
   (b) impregnating the coated honeycomb structure treated as described under (a) with an aqueous solution of salts of iron and cerium, drying the honeycomb structure so treated and impregnated at temperatures of up to 250° C. and annealing it at temperatures of up to 600° C.;
   (c) impregnating the honeycomb structure treated as described under (b) with an aqueous solution containing at least one soluble compound of at least one of said noble metals, drying the honeycomb structure so treated at temperatures of up to 250° C. and annealing it at temperatures of up to 600° C.
2. The process as claimed in claim 1, wherein the solution under (b) contains a nickel salt.
3. The process as claimed in claim 1, wherein the solution under (c) contains the metals in chloride form and has a pH of 1 to 2.
4. The process as claimed in claim 1, wherein the solution under (c) contains the metals in nitrate form and presents a pH of 1 to 2.
5. The process as claimed in claim 1, wherein the solution under (c) contains the metals in complex form with at least one substituted acetic acid selected from nitrilotriacetic acid and ethylenediaminotetraacetic acid and presents a pH of from 8 to 10.
6. A process for making a carrier-supported catalyst by applying at least one non noble-metal component and at least one noble metal component selected from the group consisting of platinum, rhodium and palladium on to a ceramic honeycomb structure coated with a layer of alumina and zirconia serving as heat-resistant metal oxides. which comprises:
   (a) dipping the ceramic honeycomb structure at least once into an aqueous suspension containing pseudoboehmite and zirconium oxide hydrate in a ratio by weight of 1:0.01 to 1:0.1. calculated as oxides, drying the honeycomb structure so treated at temperatures of up to 250° C. and calcining it at temperatures of up to 1000° C.;
   (b) impregnating the coated honeycomb structure treated as described under (a) with an aqueous solution of at least one iron salt, drying the honeycomb structure so treated and impregnated at temperatures of up to 250° C. and annealing it at temperatures of up to 600° C.;
   (c) impregnating the honeycomb structure treated as described under (b) with an aqueous solution containing at least one soluble compound of at least one of said noble metals and an aqueous solution of a cerium salt, drying the honeycomb structure so treated at temperatures of up to 250° C. and annealing it at temperatures of up to 600° C.
7. The process as claimed in claim 6, wherein the solution under (b) contains a nickel salt.
8. The process as claimed in claim 6, wherein the solution under (c) contains the metals in chloride form and has a pH of 1 to 2.
9. The process as claimed in claim 6, wherein the solution under (c) contains the metals in nitrate form and presents a pH of 1 to 2.
10. The process as claimed in claim 6, wherein the solution under (c) contains the metals in complex form with at least one substituted acetic acid selected from nitrilotriacetic acid and ethylenediaminotetraacetic acid and presents a pH of from 8 to 10.

* * * * *

UNITED STATES PATENT AND TRADEMARK OFFICE
CERTIFICATE OF CORRECTION

PATENT NO. : 4,753,915

DATED : June 28, 1988

INVENTOR(S) : Wilhelm Vogt, Hermann Glaser, Eitel Goedicke,

It is certified that error appears in the above-identified patent and that said Letters Patent is hereby corrected as shown below:

On the title page, item 73 should read: "Assignee: Hoechst Aktiengesellschaft, Frankfurt/Main, Fed. Rep. of Germany".

Signed and Sealed this

Eleventh Day of July, 1989

Attest:

DONALD J. QUIGG

Attesting Officer

Commissioner of Patents and Trademarks